US008108200B2

(12) United States Patent
Anne et al.

(10) Patent No.: US 8,108,200 B2
(45) Date of Patent: Jan. 31, 2012

(54) SYSTEM AND METHOD FOR ACCESSING AND CONFIGURING FIELD DEVICES IN A PROCESS CONTROL SYSTEM USING DISTRIBUTED CONTROL COMPONENTS

(75) Inventors: Gowtham Anne, Karnataka (IN); Prashant Maranat, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 925 days.

(21) Appl. No.: 12/123,680

(22) Filed: May 20, 2008

(65) Prior Publication Data

US 2009/0292524 A1    Nov. 26, 2009

(51) Int. Cl.
*G06F 9/455* (2006.01)
(52) U.S. Cl. ............................................... 703/23
(58) Field of Classification Search ............ 703/23; 709/230, 237
See application file for complete search history.

(56) References Cited

U.S. PATENT DOCUMENTS

| 6,105,119 | A  |  | 8/2000  | Kerr et al. |
|-----------|----|--|---------|-------------|
| 6,179,489 | B1 |  | 1/2001  | So et al. |
| 6,298,377 | B1 |  | 10/2001 | Hartikainen et al. |
| 6,618,745 | B2 | * | 9/2003 | Christensen et al. ......... 709/201 |
| 6,807,523 | B1 | * | 10/2004 | Wensink et al. ............... 703/27 |
| 7,110,843 | B2 | * | 9/2006 | Pagnano et al. .............. 700/108 |
| 2002/0087308 | A1 |  | 7/2002 | Ozawa |
| 2002/0104586 | A1 |  | 8/2002 | Morikawa et al. |
| 2002/0120723 | A1 |  | 8/2002 | Forth et al. |
| 2002/0161940 | A1 |  | 10/2002 | Eryurek et al. |
| 2003/0135563 | A1 |  | 7/2003 | Bodin et al. |
| 2004/0165544 | A1 |  | 8/2004 | Cornett et al. |
| 2004/0167750 | A1 |  | 8/2004 | Pagnano et al. |
| 2004/0259533 | A1 | * | 12/2004 | Nixon et al. .............. 455/414.1 |
| 2006/0140209 | A1 | * | 6/2006 | Cassiolato et al. ........... 370/466 |
| 2006/0217822 | A1 |  | 9/2006 | Ramanathan et al. |
| 2007/0100471 | A1 |  | 5/2007 | Kumar et al. |
| 2008/0235001 | A1 | * | 9/2008 | Cohen et al. ................. 703/26 |
| 2008/0235756 | A1 | * | 9/2008 | Cohen et al. ................. 726/1 |
| 2009/0035740 | A1 |  | 2/2009 | Reed et al. |
| 2009/0036111 | A1 |  | 2/2009 | Danford et al. |
| 2009/0150130 | A1 | * | 6/2009 | Ludwig ......................... 703/6 |
| 2009/0259612 | A1 |  | 10/2009 | Hanson |
| 2009/0292995 | A1 |  | 11/2009 | Anne et al. |
| 2009/0292996 | A1 |  | 11/2009 | Anne et al. |

FOREIGN PATENT DOCUMENTS

WO    WO 03/075206 A2    9/2003

OTHER PUBLICATIONS

Office Action dated Nov. 16, 2010 in connection with U.S. Appl. No. 12/123,658.

Office Action dated Jun. 20, 2011 in connection with U.S. Appl. No. 12/123,631.

* cited by examiner

*Primary Examiner* — Paul Rodriguez
*Assistant Examiner* — Juan Ochoa

(57) ABSTRACT

A system includes a client and an interface component. The client includes (i) a device manager associated with a field device in a process control system and (ii) a first emulator configured to emulate a communication manager. The device manager defines a user interface associated with the field device. The interface component includes (i) a second emulator configured to emulate the device manager and (ii) the communication manager. The communication manager is configured to communicate with the field device over a communication link using a specified protocol. The client is physically separated from the interface component. The communication manager could represent a communication Device Type Manager (DTM), and the device manager could represent a device DTM. Also, the first emulator could emulate at least some functions of the communication DTM, and the second emulator could emulate at least some functions of the device DTM.

20 Claims, 3 Drawing Sheets

SYSTEM AND METHOD FOR ACCESSING AND CONFIGURING FIELD DEVICES IN A PROCESS CONTROL SYSTEM USING DISTRIBUTED CONTROL COMPONENTS

CROSS-REFERENCE TO RELATED APPLICATIONS

This disclosure is related to the following U.S. patent applications:

U.S. patent application Ser. No. 12/123,658 entitled "SYSTEM AND METHOD FOR ACCESSING AND PRESENTING HEALTH INFORMATION FOR FIELD DEVICES IN A PROCESS CONTROL SYSTEM"; and U.S. patent application Ser. No. 12/123,631 entitled "SYSTEM AND METHOD FOR ACCESSING AND CONFIGURING FIELD DEVICES IN A PROCESS CONTROL SYSTEM".

All of these patent applications are hereby incorporated by reference.

TECHNICAL FIELD

This disclosure relates generally to process control systems and more specifically to a system and method for accessing and configuring field devices in a process control system using distributed control components.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Communications with field devices often occur using various standard or other protocols, such as HART, FOUNDATION Fieldbus, or PROFIBUS. These types of protocols often support the use of a structured language called the Electronic Device Description Language ("EDDL"), which is defined in the IEC 61804-3 standard. This language can be used to create device description or electronic device description ("DD/EDD") files, which describe the online functional behavior of the field devices. The DD/EDD files can be interpreted by a host application and used to control interactions with and configuration of the field devices.

Another standard technology used with field devices is Field Device Tool/Device Type Manager ("FDT/DTM") technology, which is defined in the IEC/PAS 62453 standard. This technology defines components that support "plug-and-play" use of field devices. For example, a device DTM is a component that defines a field device's configuration, and it includes a user interface for interacting with the field device. A communication DTM is a component that defines an interface for communicating with a field device using a specific protocol. Multiple communication DTMs could be provided to support communications using different protocols. A communication DTM interfaces with the host application through a field device's device DTM. As a result, the host application can merely create an instance of the appropriate device DTM and link the device DTM with the appropriate communication DTM. At this point, the host application can communicate with the field device, and the user can interact with the field device.

SUMMARY

This disclosure provides a system and method for accessing and configuring field devices in a process control system using distributed control components.

In a first embodiment, a method includes generating a request associated with a field device in a process control system at a device manager associated with at least the field device. The method also includes providing the request to a first emulator, where the first emulator emulates a communication manager associated with at least the field device. The method further includes providing the request to a second emulator, where the second emulator emulates the device manager. In addition, the method includes providing the request from the second emulator to the communication manager. The communication manager is configured to communicate the request to the field device over a communication link using a specified protocol.

In particular embodiments, the communication manager includes a communication Device Type Manager (DTM), and the device manager includes a device DTM. Also, the first emulator emulates at least some functions of the communication DTM, and the second emulator emulates at least some functions of the device DTM.

In other particular embodiments, providing the request to the second emulator includes providing the request from the first emulator to a server and providing the request from the server to the second emulator.

In yet other particular embodiments, a first device includes the device manager and the first emulator. The first device is physically remote from a second device, which includes the second emulator and the communication manager. Also, the method may further include instantiating the device manager at the first device, and linking the device manager and the first emulator, instantiating the communication manager at the second device, and linking the communication manager and the second emulator.

In still other particular embodiments, the method further includes generating a user interface for a user, where the user interface is based on the device manager. Also, the request is generated based on user input received through the user interface.

In additional particular embodiments, the first emulator emulates multiple communication managers associated with multiple field devices. Also, the second emulator emulates multiple device managers associated with the multiple field devices.

In a second embodiment, a system includes a client having (i) a device manager associated with a field device in a process control system and (ii) a first emulator configured to emulate a communication manager. The device manager defines a user interface associated with the field device. The system also includes an interface component having (i) a second emulator configured to emulate the device manager and (ii) the communication manager. The communication manager is configured to communicate with the field device over a communication link using a specified protocol. The client is physically separated from the interface component.

In a third embodiment, an apparatus includes a device manager associated with a field device in a process control system, where the device manager defines a user interface associated with the field device. The apparatus also includes a first emulator configured to emulate a communication manager associated with at least the field device. The apparatus forms at least part of a first physical device. Also, the first emulator is configured to receive a request associated with the field device from the device manager and to provide the request to a second emulator forming at least part of a second physical device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
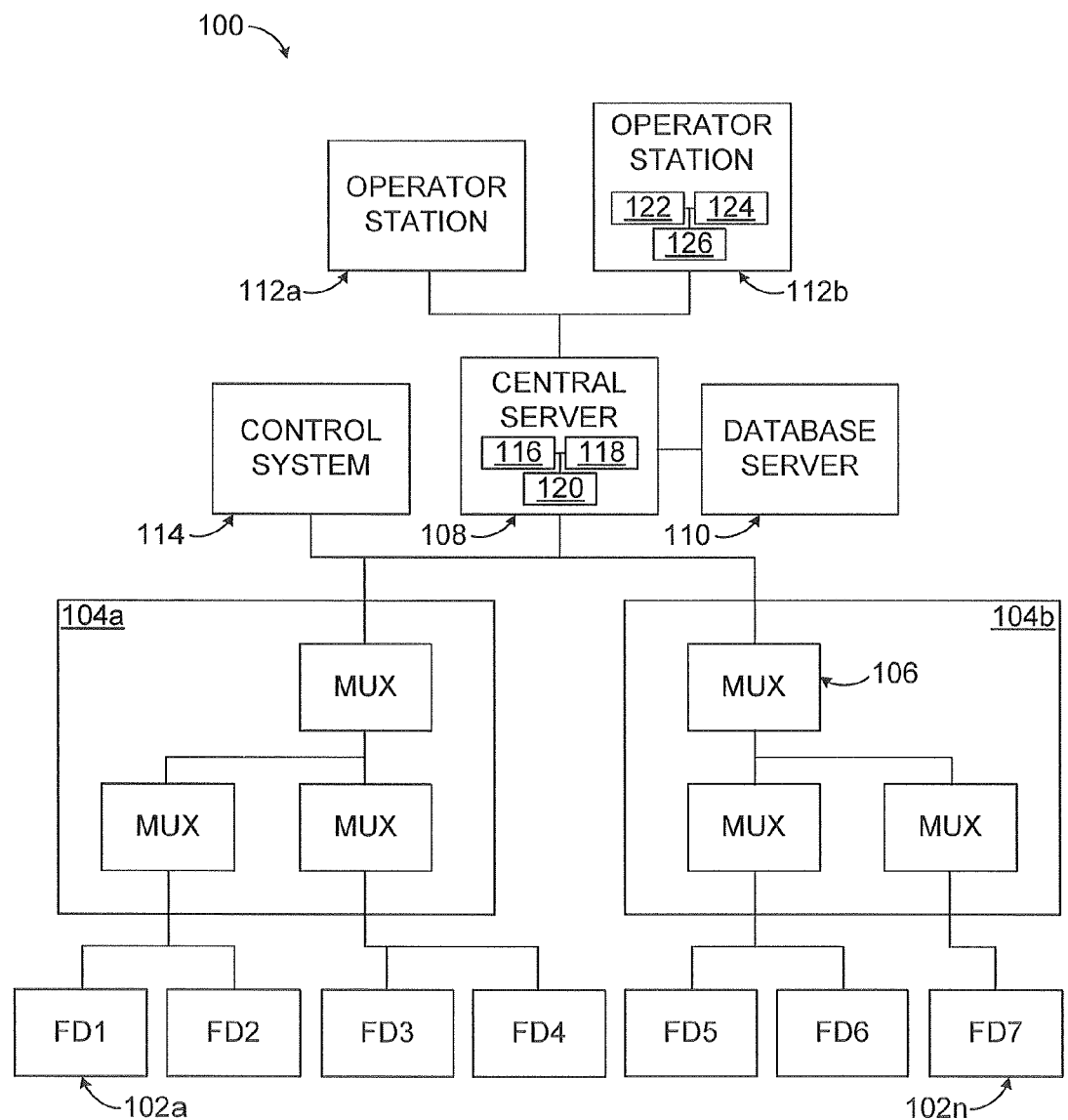
FIG. 1 illustrates an example process control system according to this disclosure.
Figure 2:
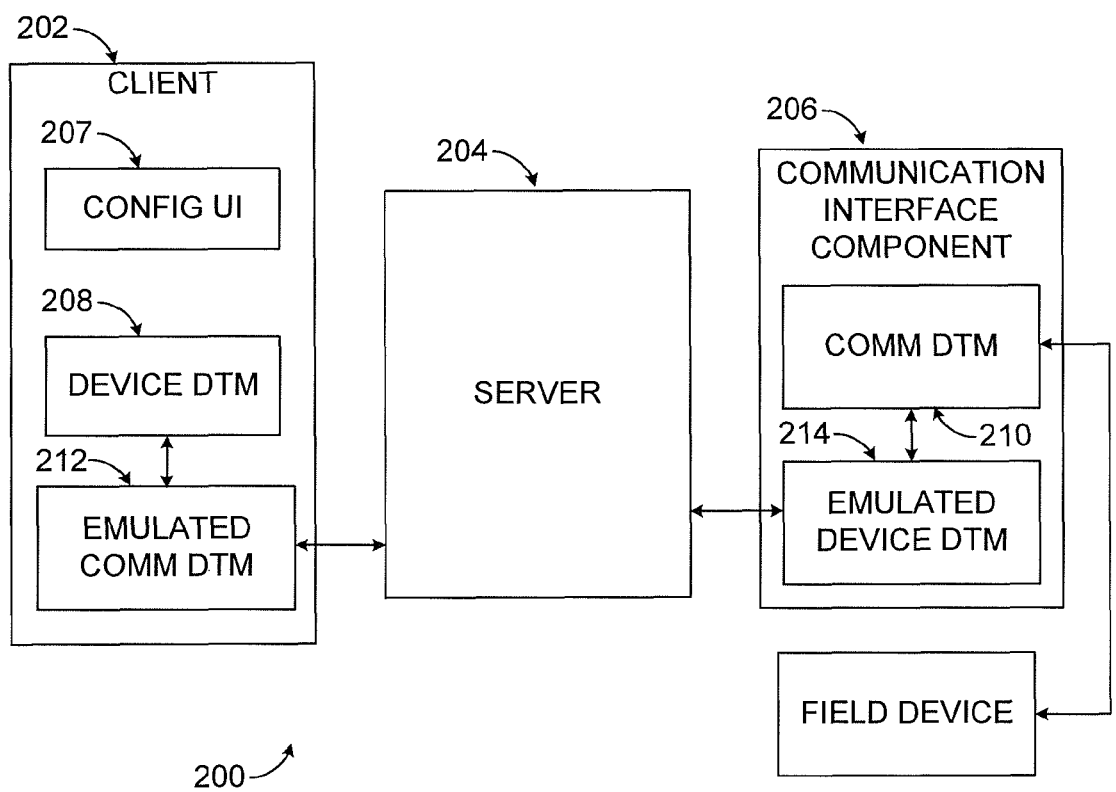
FIG. 2 illustrates an example mechanism for accessing and configuring a field device using distributed control components according to this disclosure.
Figure 3:
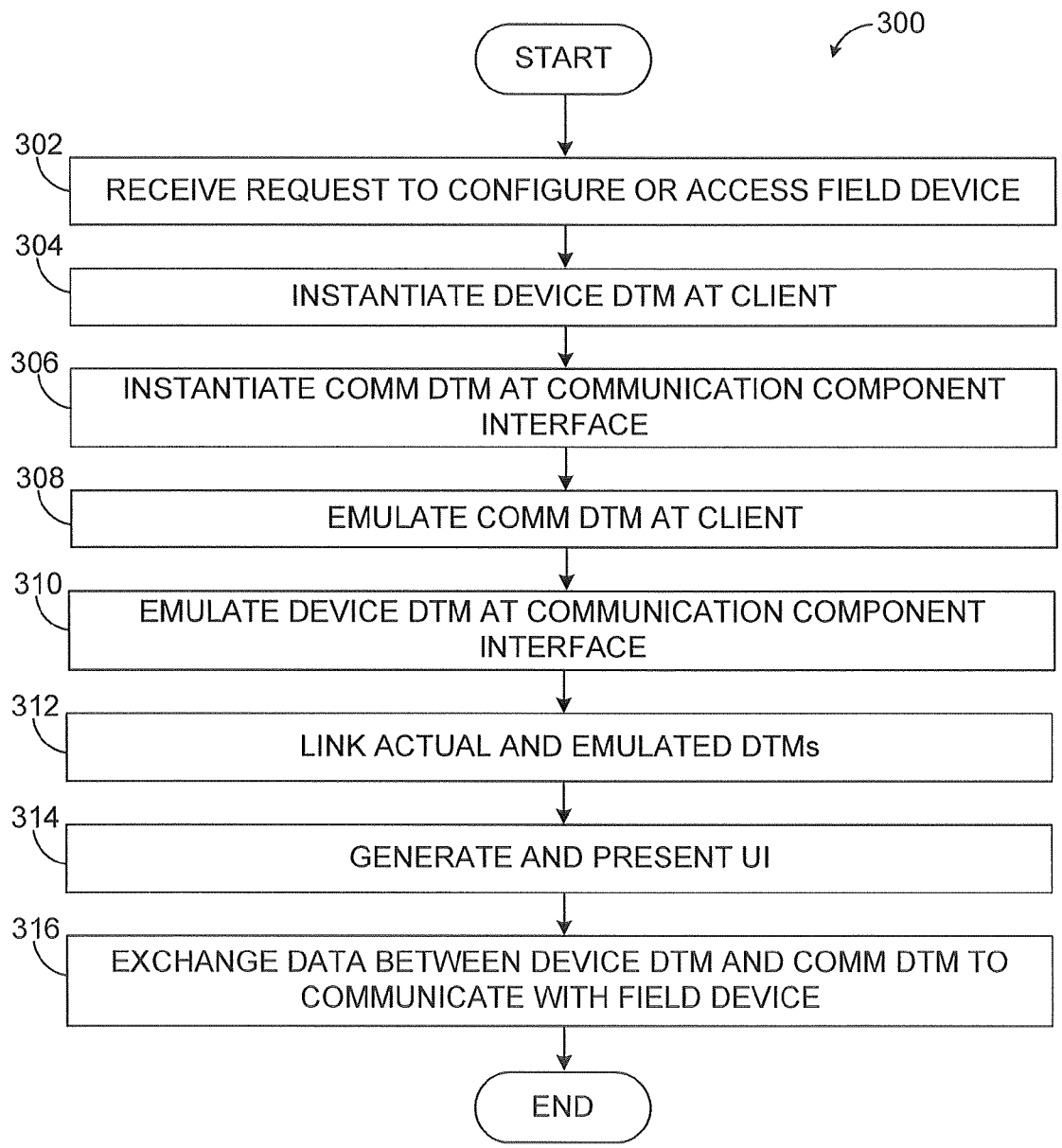
FIG. 3 illustrates an example method for accessing and configuring a field device using distributed control components according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

As shown in FIG. 1, the process control system 100 includes various field devices 102a-102n. The field devices 102a-102n represent devices that can perform a wide variety of functions in the process control system 100. The field devices 102a-102n are used to implement desired control strategies in the process control system 100. For example, the field devices 102a-102n could include sensors that measure a wide variety of characteristics in a process system, such as temperature, pressure, or flow rate. The field devices 102a-102n could also include actuators that alter a wide variety of characteristics in the process system, such as valves or heaters. The field devices 102a-102n could include any other or additional components in any suitable process system. Each of the field devices 102a-102n includes any suitable structure for performing one or more functions to implement at least one control strategy. Also, a process system may generally represent any system or portion thereof configured to process one or more products or other materials in some manner.

Each of the field devices 102a-102n is coupled to one of multiple control networks 104a-104b in this example. Each of the control networks 104a-104b generally transports control signals and other data to and from the field devices 102a-102n. Each of the control networks 104a-104b includes any suitable structure(s) facilitating interaction with one or more field devices. Also, each of the control networks 104a-104b could support any suitable protocol or protocols for communicating with one or more of the field devices 102a-102n. These protocols could include HART, FOUNDATION Fieldbus, PROFIBUS, or other protocol(s). In addition, each of the control networks 104a-104b could have any suitable network topology, and the field devices can be connected in any suitable manner to the control networks 104a-104b.

In this example, each of the control networks 104a-104b includes multiple multiplexers 106. The multiplexers 106 support communications with multiple field devices over shared communication links. For example, each of the multiplexers 106 can receive signals from multiple field devices (either directly or through other multiplexers) and multiplex the signals onto a single communication link. Each of the multiplexers 106 can also receive signals over the single communication link and de-multiplex the signals for forwarding to the field devices. The destination for specific signals transmitted through the multiplexers 106 may be determined in any suitable manner, such as based on destination addresses contained in the signals. Each of the multiplexers 106 includes any suitable structure for multiplexing and demultiplexing signals. It may be noted that the use of multiplexers 106 in the control networks 104a-104b is for illustration only. The control networks 104a-104b could include any suitable components in any suitable configuration, such as various controllers and inputs/outputs in a distributed control system (DCS).

A central server 108 is coupled to the control networks 104a-104b. The central server 108 transmits data to and receives data from the field devices 102a-102n over the control networks 104a-104b. For example, the central server 108 could send status requests to the field devices 102a-102n and receive corresponding status or diagnostic information from the field devices 102a-102n. The status information could identify a status of a field device, and the diagnostic information could identify any specific problems with the field device. The central server 108 could also send configuration requests for configuring the field devices 102a-102n over the control networks 104a-104b. Any other or additional information may be transmitted to or received from the field devices 102a-102n. The central server 108 includes any hardware, software, firmware, or combination thereof facilitating access or control over one or more field devices. In particular embodiments, the central server 108 represents a computing device executing a MICROSOFT WINDOWS operating system.

A database server 110 is coupled to the central server 108. The database server 110 stores various information used, generated, or collected by the central server 108. For example, the central server 108 could use a device description (such as a device description/electronic device description or "DD/EDD" file) to perform various functions, and the device description could be stored in the database server 110. Also, the central server 108 could retrieve status or diagnostic information associated with a field device and store the data in the database server 110. The database server 110 could store any other or additional information. The database server 110 includes any suitable structure facilitating storage and retrieval of information.

One or more operator stations 112a-112b are coupled to the central server 108. The operator stations 112a-112b represent computing or communication devices providing user access to the central server 108. The operator stations 112a-112b facilitate various interactions with users. For example, the operator stations 112a-112b could allow users to view information about and configure field devices through user interfaces provided by the central server 108. The operator stations 112a-112b could also allow users to review data collected or generated by the central server 108, such as status and diagnostic information retrieved from the field devices. Each of the operator stations 112a-112b includes any hardware, software, firmware, or combination thereof for supporting user access and control of the system 100. In particular embodiments, the operator stations 112a-112b represent computing devices executing a MICROSOFT WINDOWS operating system.

A control system 114 is also coupled to the control networks 104a-104b. The control system 114 represents a device or collection of devices that can control the operation of the field devices 102a-102n. For example, the control system 114 could receive data from certain field devices (such as sensors) and generate control signals for adjusting other field devices (such as actuators). The control system 114 generally represents any suitable hardware, software, firmware, or combination thereof for controlling the operation of one or more field devices and communication links between the field devices and the control system.

In particular embodiments, the central server 108 could include one or more processors 116 and one or more memories 118 configured to store instructions and data used, generated, or collected by the processor(s). The central server 108 could also include one or more interfaces 120 for communicating with external networks, devices, or systems, such as an Ethernet, HART, FOUNDATION Fieldbus, PROFIBUS, MODBUS, DEVICE-NET, or CAN interface. Similarly, each of the operator stations 112a-112b could include one or more processors 122 and one or more memories 124 storing instructions and data used, collected, or generated by the processor(s). The operator stations 112a-112b could also include one or more interfaces 126 for communicating with external networks or systems, such as an Ethernet interface.

In one aspect of operation, communications between the operator stations 112a-112b and the field devices 102a-102n can occur using Field Device Tool/Device Type Manager ("FDT/DTM") technology. The FDT/DTM technology generally involves the use of communication DTMs accessible through device DTMs. Different communication DTMs are often provided to support communications over different types of networks (such as multiplexer networks or other types of control networks), and different device DTMs can be used to facilitate communications with specific field devices or types of field devices.

The use of FDT/DTM technology can provide various benefits, such as the abstraction of specific communication mechanisms and protocols (which are used to communicate with field devices) from a host application. The host application can simply select the proper communication DTM for a particular field device and use that field device's device DTM to communicate through the selected communication DTM. However, communication DTMs are conventionally instantiated on devices that are coupled to the physical network attached to the field devices. Also, device DTMs conventionally need to be instantiated on the same devices as the communication DTMs. In an industrial facility, many different networks can be used in diverse geographical areas, so distributed control is typically not possible using FDT/DTM technology.

In accordance with this disclosure, distributed control can be performed using FDT/DTM technology. For example, emulated device DTMs and emulated communication DTMs can be used to allow actual device DTMs and actual communication DTMs on different physical devices to communicate and interact. In this way, FDT/DTM technology could be used and invoked in a distributed or remote manner in the system 100. Additional details regarding this functionality are provided below.

Although FIG. 1 illustrates one example of a process control system 100, various changes may be made to FIG. 1. For example, the process control system 100 could include any number of field devices, control networks, servers, operator stations, and control systems. Also, the makeup and arrangement of the control networks 104a-104b are for illustration only. The control networks 104a-104b may or may not include multiplexers, and the control networks 104a-104b could include any suitable components in any suitable configuration. In addition, FIG. 1 illustrates one operational environment in which FDT/DTM components can be emulated to support access to and control of field devices. This functionality could be used with any suitable devices and in any suitable systems.

FIG. 2 illustrates an example mechanism 200 for accessing and configuring a field device using distributed control components according to this disclosure. The embodiment of the mechanism 200 shown in FIG. 2 is for illustration only. Other embodiments of the mechanism 200 could be used without departing from the scope of this disclosure.

As shown in FIG. 2, the mechanism 200 uses multiple emulated DTMs to enable distributed or remote control using FDT/DTM technology. As noted above, communication DTMs are designed to communicate with device DTMs, but the device DTMs are conventionally required to be instantiated on the same physical device as the communication DTMs. The mechanism 200 uses multiple emulated DTMs to allow the use of device and communication DTMs that are remote from one another.

As shown in FIG. 2, the mechanism 200 includes three main components: a client 202, a server 204, and a communication interface component 206. The client 202 could represent one of the operator stations 112a-112b in FIG. 1. The server 204 could represent the central server 108 in FIG. 1. The communication interface component 206 could represent a component executed by the central server 108 or the field device or a component that is located between the central server 108 and a particular field device. In general, it may be noted that multiple ones of these components 202-206 could be implemented on a single physical component or on different physical components. Each of these components 202-206 could include any suitable hardware, software, firmware, or combination thereof for performing the functions described below.

The client 202 in this example includes or supports a configuration user interface ("UI") 207. The configuration user interface 207 represents an interface that can be provided to a user to enable configuration of a field device. For example, a user can use the configuration user interface 207 to provide configuration requests, requests for status or diagnostic data, or other requests to a field device. The configuration user interface 207 represents any suitable user interface and could be generated in any suitable manner.

The client 202 in this example also includes a device DTM 208, while the communication interface component 206 includes a communication DTM 210. The communication DTM 210 defines the interface for communicating with the field device using a specific protocol (and often a specific type of communication link). Different communication DTMs 210 could be provided in the communication interface component 206 to support different communication protocols and homogenous or heterogeneous communication links (such as HART over PROFIBUS).

In the situation shown in FIG. 2, the device DTM 208 on the client 202 is unable to directly interact with the communication DTM 210 because the client 202 is remotely located and the communication DTM 210 is running in a remote machine. Here, an emulated communication DTM 212 on the client 202 and an emulated device DTM 214 on the communication interface component 206 are used to enable distributed or remote control using FDT/DTM technology. For example, the emulated communication DTM 212 could emulate the actual communication DTM 210, and the emulated device DTM 214 could emulate the actual device DTM 208. Also, the FDT Frame interface is implemented in the client 202 to support the DTMs 208 and 212, and the FDT Frame interface is implemented in the communication interface component 206 to support the DTMs 210 and 214. One or multiple emulated communication DTMs 212 could be provided in the client 202, and one or multiple emulated device DTMs 214 could be provided in the communication interface component 206. In addition, one or multiple communication DTMs 210 could be provided in the communication interface component 206, such as one for each type of communication link or protocol used to communicate with field devices.

In this example embodiment, interaction with a field device may occur as follows. The client 202 instantiates and loads the device DTM 208, and the FDT Frame interface provides the emulated communication DTM 212. A link can be established between the device DTM 208 and the emulated communication DTM 212. Similarly, the communication interface component 206 instantiates the communication DTM 210, and the FDT Frame interface provides the emulated device DTM 214. A link can be established between the communication DTM 210 and the emulated device DTM 214.

Requests from the device DTM 208 are routed to the emulated communication DTM 212, which forwards the requests to the server 204. The server 204 sends the requests to the emulated device DTM 214, which forwards the requests to the communication DTM 210. The communication DTM 210 can then send the requests to a field device. Responses and other data can be received from the field device and traverse the opposite path through the mechanism 200. The data passes through the communication DTM 210 to the emulated device DTM 214 and then to the server 204. The server 204 provides the data to the emulated communication DTM 212, which passes the data to the device DTM 208. The data exchanged between the actual and emulated DTMs in FIG. 2 could have any suitable form, such as extensible Markup Language ("XML") documents.

In this way, the device DTM 208 and the communication DTM 210 interact with one another through the emulated DTMs 210-212. As a result, the device DTM 208 and the communication DTM 210 can provide various benefits, such as abstracting the communication mechanisms and protocols from the host application. Moreover, the emulated DTMs 212-214 allow the device DTM 208 and the communication DTM 210 to be instantiated and used on different physical devices, providing a way for distributed control in the process control system using FDT/DTM technology.

The device DTM 208 includes any hardware, software, firmware, or combination thereof for providing a user interface for interacting with a field device. The emulated communication DTM 212 includes any hardware, software, firmware, or combination thereof for emulating at least some functions of at least one communication DTM. It may be noted that a single emulated communication DTM 212 could be used to emulate one or multiple types of communication DTMs, or multiple emulated communication DTMs 212 could be used. The emulated device DTM 214 includes any hardware, software, firmware, or combination thereof for emulating at least some functions of at least one device DTM. It may be noted that a single emulated device DTM 214 could be used to emulate one or multiple types of device DTMs, or multiple emulated device DTMs 214 could be used. The communication DTM 210 includes any hardware, software, firmware, or combination thereof for enabling communication with a field device using a particular type of communication link or protocol.

Using this technique, it is possible to distribute control components across a wide range of physical devices in a process control system. Because of this, users are able to configure, monitor, and initiate maintenance operations from a central location (such as a central control room) for any field device located on various remote systems.

Although FIG. 2 illustrates one example of a mechanism 200 for accessing and configuring a field device using distributed control components, various changes may be made to FIG. 2. For example, any number of configuration user interfaces, device DTMs, communication DTMs, and emulated DTMs could be used to access and configure one or more field devices.

FIG. 3 illustrates an example method 300 for accessing and configuring a field device using distributed control components according to this disclosure. The embodiment of the method 300 shown in FIG. 3 is for illustration only. Other embodiments of the method could be used without departing from the scope of this disclosure.

As shown in FIG. 3, a request to configure or access a field device is received at step 302. This could include, for example, a user submitting a request to configure or access a field device 102*a*-102*n* in the process control system 100.

A device DTM is instantiated at a client at step 304, and a communication DTM is instantiated at a communication interface component at step 306. This could include, for example, the client 202 instantiating a device DTM 208 associated with a particular field device or type of field device. This could also include the communication interface component 206 instantiating the appropriate communication DTM 210 based on the communication link or protocol needed to communicate with a particular field device.

A communication DTM is emulated at the client at step 308, and a device DTM is emulated at the communication interface component at step 310. This could include, for example, the client 202 invoking an emulator that emulates at least some of the functions of a communication DTM. This could also include the communication interface component 206 invoking an emulator that emulates at least some of the functions of a device DTM.

The actual and emulated DTMs are linked appropriately at step 312. This could include, for example, the client 202 linking the device DTM 208 and the emulated communication DTM 212. This could also include the communication interface component 206 linking the emulated device DTM 214 and the communication DTM 210.

A user interface is generated and presented to a user at step 314. This could include, for example, the client 202 generating a user interface in accordance with the device DTM 208. The user interface could allow the user to configure, retrieve data from, or otherwise interact with the field device.

Data is exchanged between the device and communication DTMs to facilitate communication with the field device at step 316. This could include, for example, requests from the device DTM 208 being provided to the emulated communication DTM 212, which provides the requests to the server 204. This could also include the server 204 providing the requests to the communication DTM 210 through the emulated device DTM 214, and the communication DTM 210 can provide the requests to the field device. Data from the field device can traverse the same path from the communication DTM 210 to the device DTM 208.

In this way, the use of the emulated DTMs allows the benefits of FDT/DTM technology to be obtained. This can occur even when device DTMs are not used on the same physical devices as communication DTMs.

Although FIG. 3 illustrates one example of a method 300 for configuring and accessing a field device using distributed control components, various changes may be made to FIG. 3. For example, while shown as a series of steps, various steps in FIG. 3 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    receiving from an operator a first request to configure or access a field device in a process control system;
    instantiating a device manager and a communication manager associated with the field device in response to the first request, the device manager configured to define the field device's configuration, the communication manager configured to define an interface for communicating with the field device;
    generating a user interface for interacting with the field device for presentation to the operator, the user interface generated using the device manager;
    obtaining a second request associated with the field device at the device manager using the user interface;
    providing the second request to a first emulator, the first emulator emulating the communication manager;
    providing the second request from the first emulator to a second emulator, the second emulator emulating the device manager; and
    providing the second request from the second emulator to the communication manager, the communication manager configured to communicate the second request to the field device over a communication link using a specified protocol.

2. The method of claim 1, wherein:
    the communication manager comprises a communication Device Type Manager (DTM);
    the device manager comprises a device DTM;
    the first emulator emulates at least some functions of the communication DTM; and
    the second emulator emulates at least some functions of the device DTM.

3. The method of claim 1, wherein providing the second request from the first emulator to the second emulator comprises:
    providing the second request from the first emulator to a server; and
    providing the second request from the server to the second emulator.

4. The method of claim 1, wherein a first device comprising the device manager and the first emulator is physically separated from a second device comprising the second emulator and the communication manager.

5. The method of claim 4, the method comprising:
    instantiating the device manager at the first device and linking the device manager and the first emulator; and
    instantiating the communication manager at the second device and linking the communication manager and the second emulator.

6. The method of claim 1, wherein the second request is generated based on user input received through the user interface.

7. The method of claim 1, wherein:
    the first emulator emulates multiple communication managers associated with multiple field devices; and
    the second emulator emulates multiple device managers associated with the multiple field devices.

8. The method of claim 1, wherein the field device comprises at least one of: a sensor and an actuator.

9. A system comprising:
    a client comprising (i) a device manager associated with a field device in a process control system and (ii) a first emulator, the device manager configured to define the field device's configuration; and
    an interface component comprising (i) a second emulator configured to emulate the device manager and (ii) a communication manager configured to define an interface for communicating with the field device over a communication link using a specified protocol, the first emulator configured to emulate the communication manager;
    wherein:
        the client is configured to receive a first request to configure or access the field device from an operator, instantiate the device manager in response to the first request, and generate a user interface for interacting with the field device for presentation to the operator, the client configured to generate the user interface using the device manager;
        the client is also configured to obtain a second request associated with the field device at the device manager using the user interface, provide the second request from the device manager to the first emulator, and communicate the second request from the first emulator to the second emulator;

the interface component is configured to receive the second request at the second emulator and provide the second request from the second emulator to the communication manager, the communication manager configured to communicate the second request to the field device; and the client is physically separated from the interface component.

10. The system of claim 9, wherein:
the communication manager comprises a communication Device Type Manager (DTM);
the device manager comprises a device DTM;
the first emulator is configured to emulate at least some functions of the communication DTM; and
the second emulator is configured to emulate at least some functions of the device DTM.

11. The system of claim 9, further comprising:
a server configured to receive the second request from the first emulator and to provide the second request to the second emulator.

12. The system of claim 9, wherein the second request is generated by the device manager based on user input received through the user interface.

13. The system of claim 9, wherein the second request comprises one of: a request to configure the field device and a request for information from the field device.

14. The system of claim 9, wherein:
the client is configured to establish an active link between the device manager and the first emulator; and
the interface component is configured to establish an active link between the second emulator and the communication manager.

15. The system of claim 9, wherein:
the client comprises multiple device managers associated with multiple field devices;
the system comprises multiple interface components that include multiple second emulators and multiple communication managers, the multiple communication managers configured to communicate with the multiple field devices; and
the client is physically separated from the multiple interface components and at least some of the interface components are physically separated from each other.

16. An apparatus comprising:
a device manager associated with a field device in a process control system, the device manager configured to define the field device's configuration and a user interface for interacting with the field device; and
a first emulator configured to emulate a communication manager that defines an interface for communicating with at least the field device over a communication link using a specified protocol;
wherein the apparatus forms at least part of a first physical device;
wherein the apparatus is configured to receive a first request to configure or access the field device from an operator, instantiate the device manager in response to the first request, and generate the user interface for presentation to the operator, the apparatus configured to generate the user interface using the device manager;
wherein the apparatus is also configured to obtain a second request associated with the field device at the device manager using the user interface and provide the second request from the device manager to the first emulator; and
wherein the first emulator is configured to receive the second request from the device manager and to provide the second request to a second emulator forming at least part of a second physical device, the second emulator configured to provide the second request to the communication manager.

17. The apparatus of claim 16, wherein the second emulator is configured to emulate the device manager and to communicate with the communication manager.

18. The apparatus of claim 16, wherein the first emulator is configured to communicate with the second emulator through a server.

19. The apparatus of claim 16, wherein the second request is generated by the device manager based on user input received through the user interface.

20. The apparatus of claim 16, wherein the second physical device is physically separated from the first physical device.

* * * * *